Patented Nov. 6, 1923.

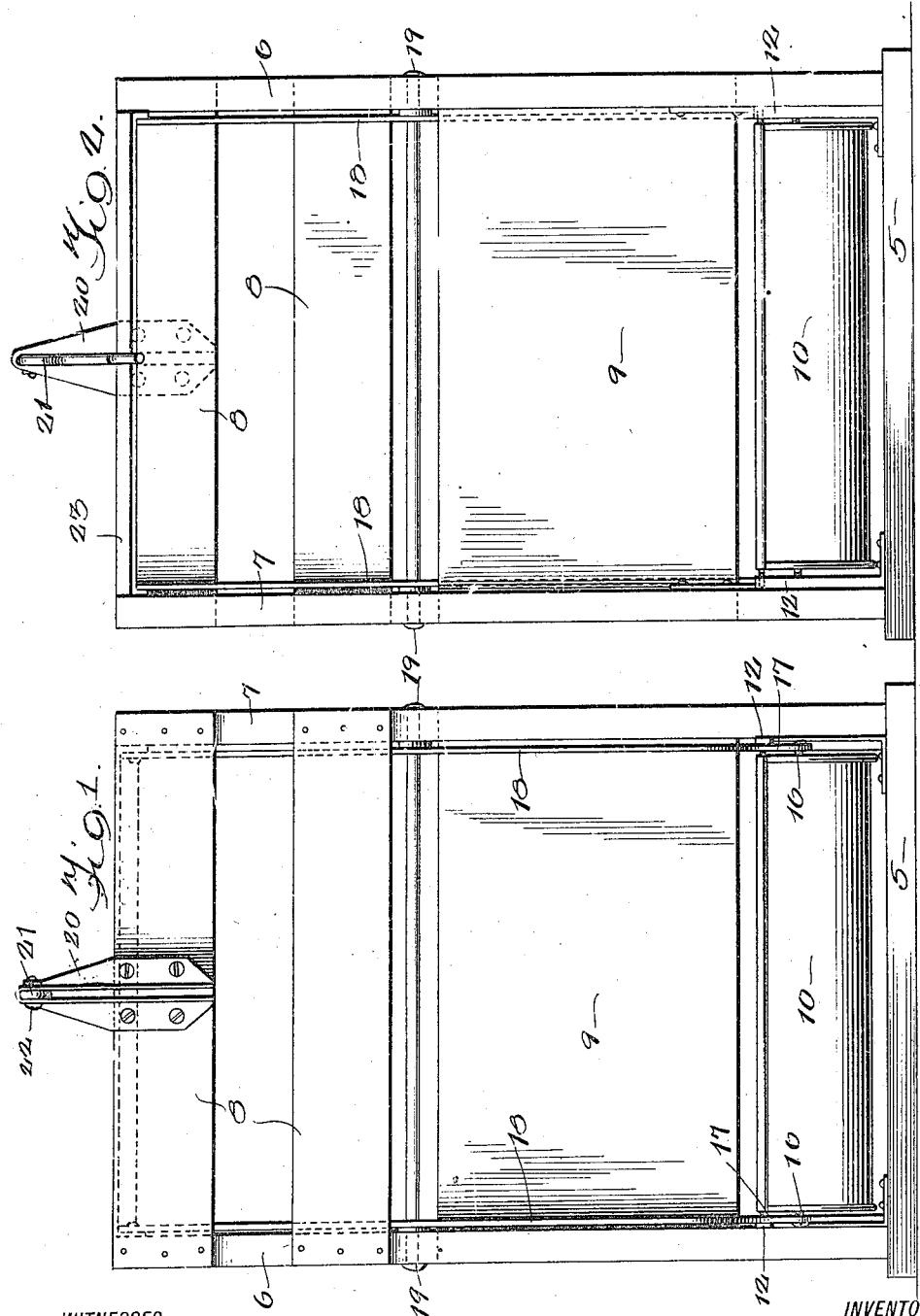

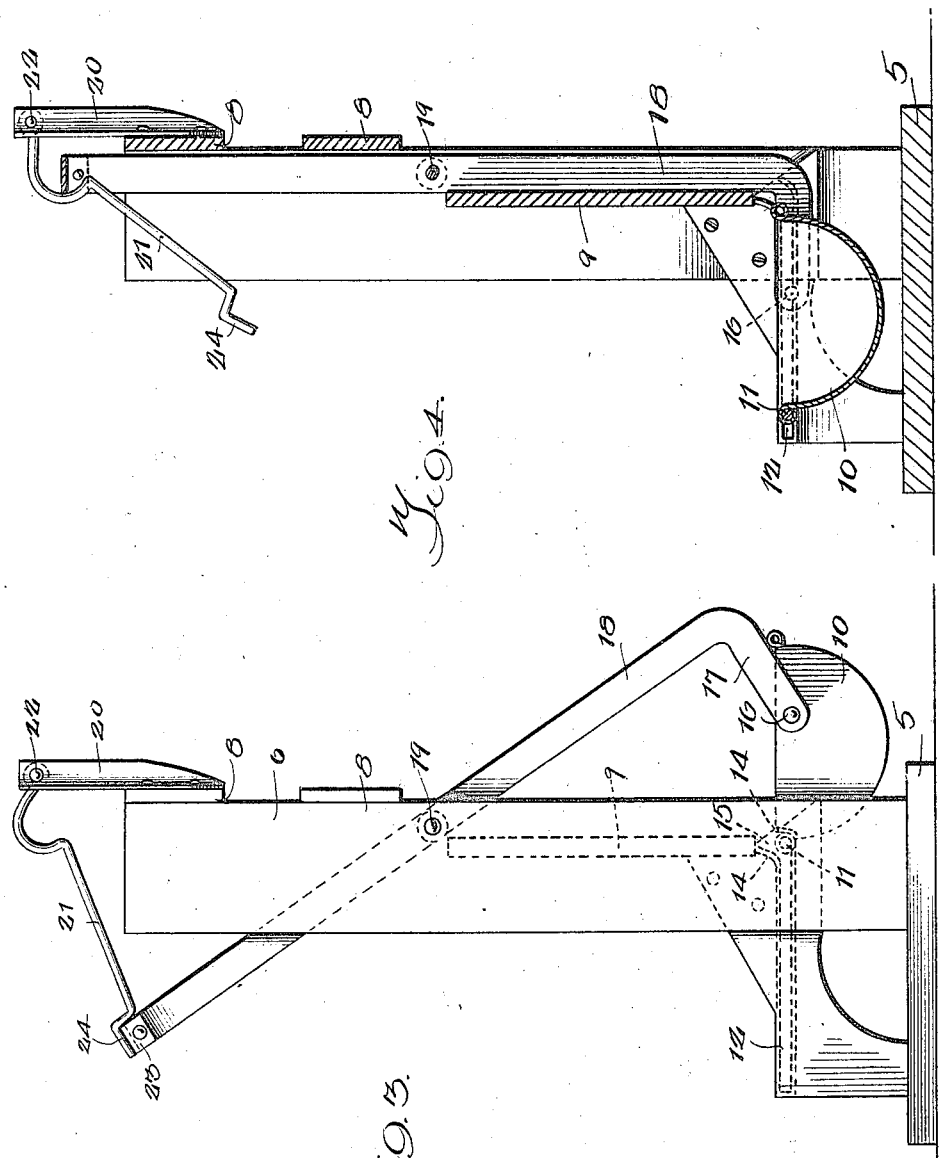

1,473,100

UNITED STATES PATENT OFFICE.

MATHIAS J. HOSCH, OF RANDOLPH, NEBRASKA.

HOG TROUGH.

Application filed October 13, 1921. Serial No. 507,428.

*To all whom it may concern:*

Be it known that I, MATHIAS J. HOSCH, a citizen of the United States, and a resident of Randolph, in the county of Cedar and State of Nebraska, have invented certain new and useful Improvements in Hog Troughs, of which the following is a specification.

My invention is an improvement in hog troughs such as used in pens or enclosures for feeding hogs.

An important object of my invention is to construct a hog trough that may be shifted from the inside of a hog pen or enclosure to the outside and also to provide means for securing the trough against movement either in or out of the pen after being shifted into the desired position.

Another object of my invention is to provide a hog trough which is simple in construction and yet exceedingly efficient in its operation.

Other objects and advantages of the invention reside in certain novel features of construction, combination and arrangement of parts which will be hereafter more fully described and claimed reference being had to accompanying drawings in which, Figure 1 is a front view showing troughs secured on the inside of pen or enclosure.

Figure 2 is a rear view of my invention showing trough secured on the outside of pen or enclosure, Figure 3 is a side view showing trough secured on the outside of the pen or enclosure and, Figure 4 is a sectional view showing the trough shifter and part of frame.

In the drawings a base 5 is provided to support the uprights 6 and 7 which are secured by the transverse braces 8 on the outside and by the opaque partition 9 on the inside of the frame.

The trough 10 has trunnions as shown at 11 which are adapted to move backward and forward in the guide-ways 12 and 13. The rearward ends of the guide-ways are curved upwardly to form stop 14 for limiting the motion of the trough yet allowing the trough to be lifted out of the guide-ways through the opening 15 as shown at 16. The trough is pivotally attached off center to the angled ends 17 of a shifter frame 18, the shifter frame being pivotally mounted on a transverse rod 19 as shown in Figures 3 and 4. A supporting member 20 is mounted on the upper brace 8 midway between the uprights 6 and 7, and pivotally connected thereto is a lock 21 as shown.

This lock 21 is provided near its pivot end 22 with an approximately U-shaped portion for engaging the transverse bar 23 of the shifter frame thereby securely locking the trough 10 within the pen for feeding.

The opposite end of the lock 21 is bent to form a seat 24 for the bar 23 when the same is thrust outwardly, due to the operator moving the trough 10 to the exterior of the pen for refilling. It will thus be seen that the trough may be securely held in either position by the locking means.

It should also be noted since the guide-ways 12 are open at 15, that the trough may be entirely disengaged from the guide-ways for cleaning or dumping purposes and the like. In use, the trough is placed in the guide-ways 12 and the feed is poured into the trough 1 from the outside of the pen. The lock is raised disengaging it from the bar 23. The operator there grasps the shifter frame and pulls toward the main frame which causes the trough to move along the guide-ways into the pen to the desired position by engaging the bar with U-shaped end of the lock until hogs have finished feeding.

The trough is brought outside of the pen by disengaging the fastening means and pushing the shifter frame away from the main frame. The trough may then be lifted from the guide-ways and may be allowed to swing free thereby automatically dumping any contents remaining in the trough.

Although I have described only one form of my invention it is to be understood that various changes may be made in the construction and arrangement of parts without departing from the spirit of the invention or the scope of the subjoined claims.

I claim:

1. A device of the character described comprising a supporting frame, including a base, having guide-ways, said guide-ways being in alignment and curved at one end, an upright extending above the base; a trough, having trunnions adapted to ride in the guide-ways and thereby carry the trough from one position to the other; a shifting frame pivotally connected to the trough at a point off its center, said shifting frame being pivotally connected to the uprights and consisting of a pair of arms and a transverse bar connecting the arms at their upper ends; locking means for holding the shifting frame in the desired position consisting of a support secured to the supporting frame and a locking member pivoted to the support and having its body bent at each end to conform to the shape of the transverse bar; and an opaque partition mounted between the uprights of the supporting frame, all as and for the purposes set forth.

2. In a hog trough, a main frame, a trough, a shifting frame for moving the trough, and means for locking the shifting frame including a locking bar pivoted to the main frame, said locking bar having a U-shaped portion near its pivot end for holding the shifting frame in one position, and a bent portion at the other end for holding the shifting frame in the other position.

3. In a hog trough, a main frame having guide-ways extending in alinement in direction of length and being curved at one end, a trough journaled and movable within the guideways, a shifting frame mounted within the main frame and connected at its lower end to the trough, and an opaque partition mounted within the main frame, substantially described.

4. In a hog trough, a main frame having a horizontal guideway turned upwardly at one end and being open at its upwardly turned end, a trough swingingly supported upon the frame, and means carried by the trough in position to enter said guideway through the open end thereof, and to then work in said guideway to prevent tilting of the trough.

5. In a hog trough, a main frame having a transverse guideway open at its one end, a shifter frame pivoted upon the main frame, a trough swingingly supported upon the shifter frame, and means carried by the trough in position to pass into and out of said guideway and to co-operate with said guideway when in engagement therewith to prevent tilting of the trough.

6. In a hog trough, a main frame having a transverse guideway open at its one end, a shifter frame pivoted upon the main frame, a trough swingingly supported upon the shifter frame, means carried by the trough in position to pass into and out of said guideway and to cooperate with said guideway when in engagement therewith to prevent tilting of the trough, and to guide said trough in its swinging movement, and means carried by said main frame for engaging said shifter frame to releasably hold the latter in a plurality of positions selectively, whereby said trough may be held with the guide means carried thereby in or out of engagement with the guideway, as desired.

7. In a hog trough, a main frame having a transverse guideway provided with an entrance, a trough pivotally supported upon the main frame to swing transversely, and a guide projecting from one end of the trough, and adapted to move into and out of the guideway through said entrance when said trough has been swung into a certain position, said guide being adapted to engage with the guideway to prevent tilting of the trough about the axis of its pivoted support.

8. In a hog trough, a main frame having a transverse guideway provided with an entrance, a trough pivotally supported upon the main frame at a point lateral of the longitudinal median line of the former to swing transversely, and a guide projecting from one end of the trough and adapted to move into and out of the guideway through said entrance when said trough has been swung into a certain position, said guide being adapted to engage with the guide way to prevent tilting of the trough about the axis if its pivoted support.

9. In a hog trough, a main frame, having a transverse guideway provided with an entrance, a trough pivotally supported adjacent its upper edge and at a point laterally of the longitudinal median line of the frame to swing transversely upon the main frame, and a guide projecting from one end of the trough and adjacent the upper edge thereof, said guide being adapted to move into and out of the guideway through said entrance when said trough has been swung into a certain position, said guide being adapted to engage with the guideway to prevent tilting of the trough about the axes of its pivoted support.

MATHIAS J. HOSCH.